(12) United States Patent  
Eriksson (10) Patent No.: US 7,461,675 B2
(45) Date of Patent: Dec. 9, 2008

(54) BARKING DEVICE AND BARKING TOOL (75) Inventor: Bror Eriksson, Njutanger (SE)

(73) Assignee: Iggesund Tools AB, Iggesund (SE)

(*) Notice: Subject to any disclaimer, the term of this patent is extended or adjusted under 35 U.S.C. 154(b) by 0 days.

(21) Appl. No.: 10/574,234

(22) PCT Filed: Oct. 2, 2003

(86) PCT No.: PCT/SE03/01528
§ 371 (c)(1),
(2), (4) Date: Apr. 3, 2007

(87) PCT Pub. No.: WO2005/030447
PCT Pub. Date: Apr. 7, 2005

(65) Prior Publication Data
US 2007/0261762 A1 Nov. 15, 2007

(51) Int. Cl.
B27L 1/00 (2006.01)

(52) U.S. Cl. .......... 144/208.1; 144/208.8; 144/241

(58) Field of Classification Search ........... 144/208.1, 144/208.4, 208.5, 208.7, 208.8, 241, 208.9
See application file for complete search history.

(56) References Cited

U.S. PATENT DOCUMENTS

| 4,231,406 | A | * | 11/1980 | Jonsson | 144/208.8 |
| 4,709,737 | A | * | 12/1987 | Jonsson | 144/241 |
| 4,852,622 | A | * | 8/1989 | Eriksson | 144/208.8 |
| 5,460,212 | A | * | 10/1995 | Darden | 144/208.8 |
| 5,653,274 | A | * | 8/1997 | Johnson et al. | 144/208.8 |
| 6,244,312 | B1 | * | 6/2001 | Hoffman | 144/208.8 |

* cited by examiner

Primary Examiner—Shelley Self
(74) Attorney, Agent, or Firm—Fitzpatrick, Cella, Harper & Scinto

(57) ABSTRACT

The barking device includes a barking arm and a barking tool which is mounted in a tool seat of the barking arm. The barking tool has a convex mounting surface, while the seat surface of the barking arm is concave. The barking tool is movably mounted in the tool seat and displaceable by rotating displacement. It is connected to the tool seat by a screw and a sleeve-like nut. The head of one of the screw or nut is designed to prevent displacement and rotation of the barking tool.

8 Claims, 4 Drawing Sheets

BARKING DEVICE AND BARKING TOOL

The present invention relates to the field of barking of logs and, more specifically, to barking machines referred to as rotation ring barkers which comprise an annular rotor on which a plurality of swinging arms are pivotally mounted. Barking tools provided with barking edges are mounted at the free outer ends of the swinging arms. The swinging arms are biased inwards to the centre of the rotor in such a manner that, when the rotor is rotated and a log that is to be barked is simultaneously longitudinally fed through the centre of the rotor, the barking edges of the barking tools will be applied against the circumferential surface of the log so that its bark is shorn off in helical strips. The invention relates to a barking device and a barking tool for such barking machines, which make it possible to set the barking tool at different contact angles to the circumferential surface of the log in order to adjust the contact angle to the circumstances with regard to, for example, season and/or tree species.

BACKGROUND ART

U.S. Pat. No. 4,709,737 discloses a barking device according to the preamble to claim 1 and a barking tool according to the preamble to claim 6. More specifically, this patent specification discloses a barking arm which at its outer end is formed with a concave seat surface and a barking tool with a convex mounting surface. Two main embodiments are shown, viz. a first embodiment in which the seat surface and the mounting surface have an essentially part-circular-cylindrical shape and a second embodiment in which the seat surface and the mounting surface are essentially part-spherical. By designing the seat surface and the mounting surface in this way, it is possible, by rotatingly displacing the barking tool in the seat surface of the barking arm, to locate the barking tool in different positions which provide different contact angles, and thus different degrees of aggressiveness, of the front barking-edge-forming edge portion to the circumferential surface of the log which is to be barked.

Such an embodiment is highly advantageous since different tree species may require different contact angles of the barking tools. Also when barking the same kind of tree species, the contact angle of the barking tool may have to be changed owing to a change in temperature, since, for instance, frozen bark is considerably more difficult to shear off than unfrozen bark.

Another common alternative is to manufacture barking tools which are made with different contact angles, allowing the barking tools to be changed when required, instead of changing the position of the barking tool on the barking arm. The drawback in this case, however, is that several sets of barking tools must be available for one and the same barking machine, and it is also time-consuming to completely exchange the barking tools, which in some cases may have to be done several times a day.

These drawbacks are eliminated by the embodiments that are disclosed in said U.S. Pat. No. 4,709,737. Among other things, one and the same set of barking tools can be mounted in two or more different mounting positions with different contact angles of the front barking-edge-forming edge portions to the circumferential surface of the log. However, there remain other problems and draw-backs.

According to a first embodiment as shown in FIGS. 1-4, the mounting surface and the seat surface are essentially part-circular-cylindrical. To lock the barking tool parallel to the axis of curvature of the part-circular-cylindrical surfaces, the mounting surface of the barking tool is made with a ridge and the seat surface of the barking arm is made with a groove perpendicular to the axis of curvature of the circular-cylindrical surfaces. In order to also lock the barking tool against motion in the longitudinal direction of the groove and the ridge, a turnable body is arranged in the barking arm, which body on the side facing the barking tool has an eccentrically positioned projection, which by turning of the body is settable in two different positions to engage in corresponding recesses in the mounting surface of the barking tool. In such a construction, the barking tool must be completely removed when reset since the body must be turned. Such a construction also comprises many separate parts and involves quite a number of machining steps of the barking tool as well as the barking arm.

In a second embodiment as shown in FIGS. 5-8, the mounting surface and the seat surface are part-spherical. The mounting surface of the barking tool has a ridge whereas the seat surface of the barking arm has three intersecting grooves. The ridge and the grooves lock the barking tool against motion essentially parallel to the intended direction of the feeding of the logs and the three intersecting grooves in the seat surface make it possible to mount the barking tool with its barking edge at three different angles relative to the direction of feeding of the logs in order to compensate for the tapered shape of the logs. In this construction however, the barking tool is not locked in the longitudinal direction of the ridge and the grooves, but these forces are fully absorbed by the shank of the screw with an increased risk of breaking the same. The spherical design also implies that the nut cooperating with the screw is not prevented from rotating, but can rotate as the screw is being tightened, which may make mounting difficult.

In a third embodiment as shown in FIGS. 9-12, the mounting surface and the seat surface are part-spherical like in the second embodiment. Locking of the barking tool both in the direction of feeding of the logs and perpendicular thereto is effected by means of small projections on the mounting surface of the barking tool, which projections can optionally engage in one of a plurality of recesses in the seat surface of the barking arm. Also in this case, the spherical design implies that there is no locking of the nut, but there is a risk of its rotating when tightening the screw. Furthermore, the projections and the recesses cause increased machining of the mounting surface and the seat surface, and there is a risk that the small recesses are blocked by dirt, resin and the like, which makes the resetting of the barking tool difficult.

BRIEF DESCRIPTION OF THE INVENTION

The present invention aims at obviating problems and drawbacks of prior-art technique and providing a barking device in which the barking tool is quickly and easily settable and safely retainable with its front barking-edge-forming edge portion at two or more different contact angles to the circumferential surface of a log to be barked. At least this object is achieved by a barking device according to claim 1.

A further object of the invention is to provide a barking device, which has a design making manufacture relatively easy and reducing the need for machining to a minimum, and which comprises a small number of separate parts.

The invention also relates to a barking tool with essentially the same objects as stated above, which is achieved by means of a barking tool according to claim 6.

According to another aspect, it is an object of the invention to allow resetting of the barking tool without having to completely dismount the barking tool from the barking arm.

The invention thus is based on the knowledge that these objects and advantages can be achieved by a barking device comprising a barking arm and a barking tool, in which the barking tool is made with a convex mounting surface which is curved in the form of a circular arc about an axis of curvature, the mounting surface being mountable on a concave seat surface which is arranged in the barking arm and which is curved in the form of a circular arc about an axis of curvature which is oriented essentially parallel to the intended direction of feeding of the logs. This makes it possible to obtain different contact angles of a front barking edge by mounting the barking tool in different displaced mounting positions relative to the seat surface of the barking arm.

Within the scope of such an embodiment, the mounting surface and the seat surface can be formed in a variety of ways. The mounting surface and the seat surface are thus not limited to have a part-circular-cylindrical shape, but can also be, for instance, part-spherical or, like in a preferred embodiment according to the invention, the mounting surface is keel-shaped with a greatest radius of curvature in the area of its centre while the radii of curvature decrease towards the lateral edges of the barking tool. The seat surface of the barking arm is designed correspondingly with the shape of a groove which has a greatest radius of curvature in the area of its centre while the radii of curvature decrease towards the lateral edges of the seat surface. A mounting surface and a seat surface designed in this manner are, except being well suited to take up lateral forces, i.e. forces directed parallel to the direction of feeding of the logs, also easy to keep clean by the absence of narrow grooves and ridges.

Thus, all embodiments are possible where the mounting surface and the seat surface are curved in the form of circular arcs in a plane which is oriented essentially perpendicular to the intended direction of feeding of the logs, but the radii of curvature may vary parallel to the direction of feeding of the logs. Such a design makes it possible to rotatingly displace the mounting surface relative to the seat surface essentially perpendicular to the intended direction of feeding of the logs and, in this way, obtain different contact angles of the front barking-edge-forming edge portion of the barking tool relative to the circumferential surface of the logs.

Another consequence of rotatingly displacing the barking tool is that also the angle of the barking tool lateral edge located right at the top towards the direction of feeding of the logs will be changed. In most cases, this edge is specially designed to serve as a climbing edge and allow smooth and careful climbing of the barking tool and the barking arm on the circumferential surface of the log when the log end arrives at the barking machine. A subordinated object of the present invention therefore is to easily allow a change of the angle of the climbing edge in order to eliminate or reduce climbing damage to the timber.

However, the invention is not limited to the feature that the planes of the radii of curvature are strictly perpendicular to, i.e. that the mounting and seat surfaces are curved in the form of circular arcs about axes of curvature that are parallel to, the intended direction of feeding of the logs. In some cases, it could be advantageous to let these angles deviate slightly from perpendicular to and parallel to, respectively, for instance in order to compensate for the tapered shape of the logs. This requires, however, that the logs always be fed with the same end first.

Furthermore, the mounting and seat surfaces need not be continuously extended but could also consist of two or more partial surfaces of a smaller size. If, for instance, the mounting surface of the barking tool is continuous, the seat surface of the barking arm could consist of the outer surfaces of two or more ridges against which the mounting surface abuts.

In the preferred embodiment, the barking tool is symmetrical and formed with two opposite barking edges, so that the barking tool is reversible in order to extend its operating time. With spherical mounting and seat surfaces, it would be possible, however, to have more than two barking edges on the same barking tool.

In a preferred embodiment, the mounting surface is keel-shaped and the seat surface is groove-shaped. This results in high stability in the lateral direction, i.e. parallel to the direction of feeding of the logs, in relation to the alternative involving pure part-circular-cylindrical surfaces, owing to the shape defining a distinct mounting position which prevents lateral displacement parallel to the direction of feeding by the barking tool being pressed with the aid of a connecting means against the seat surface of the barking arm. For further improvement of the retaining of the barking tool on the barking arm, the radius of curvature of the seat surface can be smaller than the corresponding radius of curvature of the mounting surface. This results in a clamping effect by deformation of the material as the barking tool is being pressed against the barking arm. In the case where the mounting and seat surfaces are spherically designed, there should be some kind of rotation-preventing engaging means, in the form of, for instance, projections and recesses, between the barking tool and the barking arm, thereby preventing rotation of the barking tool in operation.

According to the inventive barking device, the barking tool or the barking arm has an elongate through groove, which extends essentially perpendicular to the intended direction of feeding of the logs and which has a countersink along the lateral edges of the groove, which countersink, optionally together with the groove, serves as a rotation- and displacement-preventing engaging means for the head of the connecting means.

The connecting means connecting the barking tool to the barking arm further comprises two connecting means parts, viz. a first connecting means part in the form of a screw with an externally threaded shank and a head whose diameter is greater than the shank, and a second connecting means part in the form of a sleeve-like nut with an internally threaded shank, into which the shank of the screw is screwable, and a head whose diameter is greater than the shank.

According to the invention, one of the connecting means parts is insertable into the groove in the barking arm or the barking tool and its head has a shape and size which fits into the countersink along the groove essentially without play so that it can engage in the counter-sink and/or the groove in a manner preventing displacement and rotation. Preferably, the shape of the head conforms with the shape of the countersink so that the countersink is completely filled out in the mounted state of the connecting means part. This prevents dirt from getting stuck in the countersink during operation of the barking device. Moreover, the connecting means part which does not prevent rotation and displacement should be rotatable and its head should be provided with screw-engaging means, for instance a hexagonal shape, to be engageable by means of a screw tool for rotating the same and, thus, providing tightening or loosening of the screw joint.

Within the scope of this general inventive idea, the barking device can be designed in various ways. In the preferred design, which is shown in the following embodiments, the groove is formed in the barking tool and the sleeve-like nut is inserted with its shank into the groove so that its head abuts in the countersink round the groove. The head of the nut is designed so as to be engageable with the countersink and the groove in a manner preventing both rotation and displacement. The screw is inserted from the barking arm side and its head is formed with a screw-engaging means in the form of an external hexagonal shape and thus is threadingly screwable into and unscrewable from the nut. In alternative embodiments, however, the groove could also be formed in the barking arm, the nut could be inserted from the barking arm side or the head of the screw could be placed in the groove and designed to be engageable with the countersink along the lateral edge of the groove and/or the actual groove in a manner preventing displacement and rotation, while the head of the nut is provided with screw-engaging means to be tightenable and loosenable from the screw. Moreover, the head of the connecting means parts which is placed in the countersink round the groove may have different shapes as long as it is capable of satisfying the basic requirements of preventing, in the tightened state, rotation as well as displacement relative to the countersink and/or the groove. A plurality of different combinations of these alternatives are conceivable.

According to the invention, one of the connecting means parts is formed as a sleeve-like nut with an internally threaded shank and a head. In a preferred embodiment, the length of the shank is adapted so that, in a tightened state when the barking tool is firmly connected to the barking arm, the shank extends through the entire part from which it is inserted, i.e. the barking tool in the shown preferred embodiment, and extends also a distance into the other part, i.e. the barking arm in the shown embodiment. As a result, the screw is relieved by only needing to absorb the tensile force which is required to safely connect the barking tool to the barking arm. However, the entire shear force and torque will be absorbed by the shank of the nut. Such an embodiment, however, is not absolutely necessary but the shank of the nut could be closed before it reaches through the entire part from which it is inserted (the barking tool in the shown embodiment). This is advantageous since an extra machining step for making a recess for the shank of the nut in the other part is avoided. Such a design is facilitated if the mounting surface and the seat surface are designed so as to obtain a clamping effect in mounting by the material of the barking tool and the barking arm being deformed when tightening the screw joint, as has been described above. This results in a clamping joint which contributes to holding the barking tool in a fixed position, which prevents the screw from being subjected to shear force and torque. In the shown preferred embodiment, the nut is closed at the end where the head is located, but it could also be open at both ends, like a tube.

In a tightened state with the mounting surface of the barking tool pressed against the seat surface of the barking arm, the head of one of the connecting means parts is positioned, in a manner preventing rotation and displacement, in the groove and/or the countersink round the same. The head as well as the countersink can be designed in various ways. As mentioned above, it is advantageous if the head fills out the entire countersink to prevent penetration of dirt, but the countersink need not necessarily have a uniform width round the groove so as to obtain an elongate shape as in the shown embodiment. Thus, it would also be possible to have a completely square countersink and head. It would also be possible to have a completely circular countersink and head if the associated shank is placed eccentrically to the head. For the purpose of preventing rotation, such a head and countersink could be supplemented, for instance, with some kind of projections and recesses in the case where the shank is centred on the head. Moreover the countersink need not be continuous along the entire circumference of the groove.

As mentioned above, there are two different ways of providing setting of the barking tool in different mounting positions, so that its front barking-edge-forming edge portion takes a different angle relative to the log surfaces that are to be barked, i.e. different degrees of aggressiveness. One way involves turning a displacement and rotation preventing head with an eccentrically arranged shank. In that case, the screw joint need not be completely released, but only to such an extent that the head can be raised from the countersink and turned. The other way involves exchanging the displacement and rotation preventing connecting means for one with a different eccentricity or no eccentricity at all. It is thus possible to rotatingly displace the barking tool to an arbitrary mounting position by a suitable design of the connecting means.

BRIEF DESCRIPTION OF THE DRAWINGS

In the accompanying drawings.

DETAILED DESCRIPTION OF A PREFERRED EMBODIMENT OF THE INVENTION

In the present description, the terms transversely, cross-section etc, relate to a direction transversely to the longitudinal extent of the barking arm, parallel to the direction of feeding of the logs. The terms in the longitudinal direction, longitudinal section etc. relate to a direction in the longitudinal extent of the barking arm, perpendicular to the direction of feeding of the logs. By front end of the barking arm is meant the outer free end of the barking arm including the tool seat for the barking tool, which is adapted to be applied against the circumferential surface of a log which is to barked.

Figure 1:
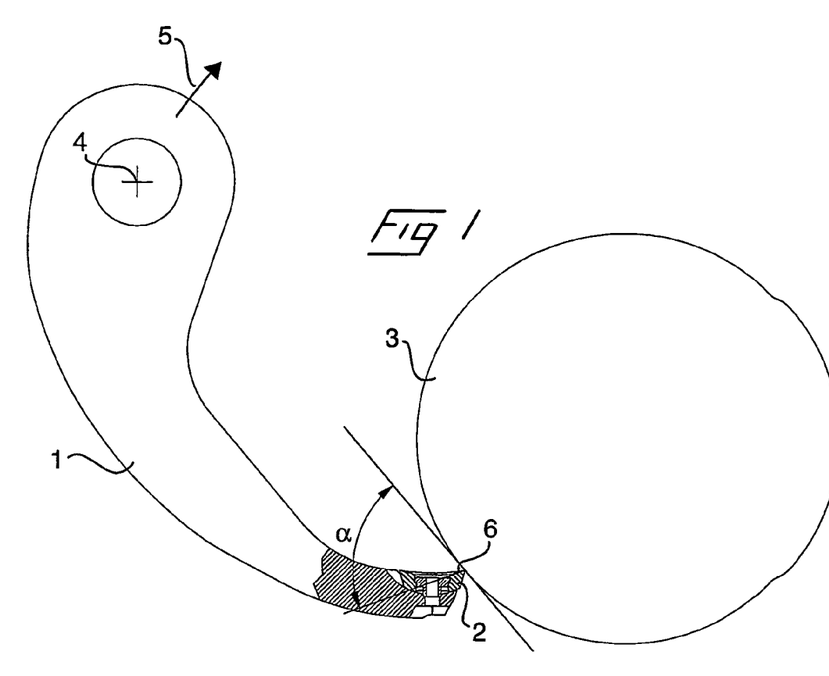
FIG. 1 is a schematic, partly cross-sectional side view of a barking device according to the invention comprising a barking arm and a barking tool, while barking a log.
Figure 2:
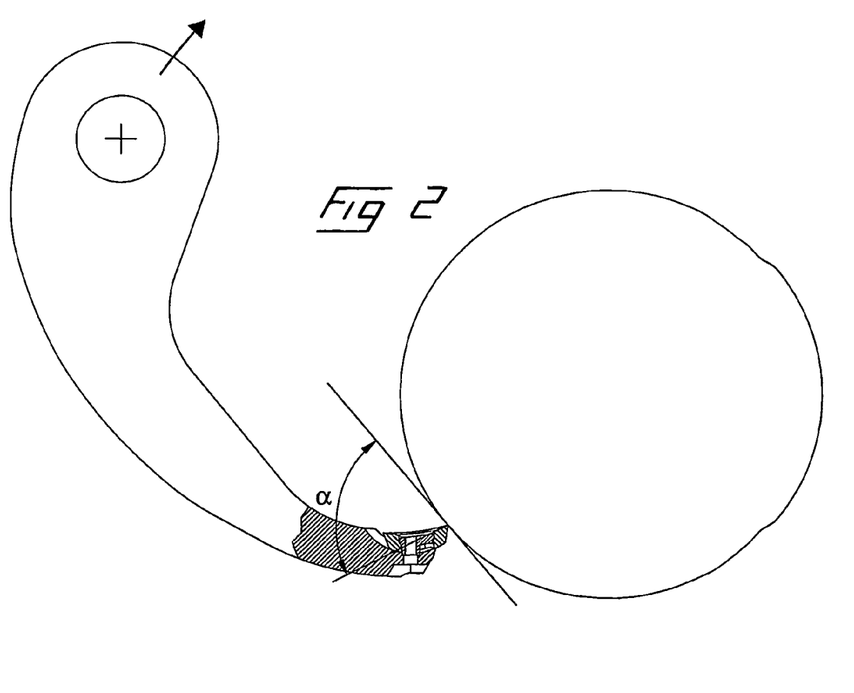
FIG. 2 is a side view according to FIG. 1, with the barking tool set at a greater angle between the front barking-edge-forming edge portion and the circumferential surface of the log.

Reference is first made to FIGS. 1 and 2, which schematically show a barking device comprising a barking arm 1 and a barking tool 2 during barking of a log 3. The barking arm is, by means of a pivot joint, with its centre of turning at the point 4, pivotally connected at its inner end to a rotatable, annular rotor (not shown), which is adapted to rotate in the direction of the arrow 5. As a rule, five such barking arms are arranged along the circumference of the rotor and by longitudinal feeding of the logs that are to be barked through the centre of the rotor during simultaneous rotating of the rotor, the barking tool will shear off the bark from the logs in helical strips. To allow this, the barking arms are force-actuated by means of springs or hydraulic/pneumatic pressure to pivot their outer ends towards the circumferential surface of the log.

The barking tool 2 is mounted in a tool seat at the outer end of the barking arm 1 and is rotatingly displaceable between different mounting positions, as will be described in more detail below. In FIG. 1, the barking tool assumes a central position and the angle α between a front barking-edge-forming edge portion 6 of the barking tool and a tangent to the circumferential surface of the log at the engaging point of the barking edge, is here about 70°. In FIG. 2, the barking tool has been rotatingly displaced to an outer position and the angle α is here about 77°. Correspondingly, the barking tool can be rotatingly displaced to an inner position, in which the angle α will be about 63°. In this embodiment of the invention, the contact angle α will thus be varied by about 14° in three steps for precisely the shown diameter of the logs. However, the invention allows arbitrary setting of the contact angle by using a suitably designed connecting means, and for instance when selecting different radii of curvature of the mounting and seat surfaces, other changes of angle could be provided by a corresponding rotating displacement. For example, with small radii of curvature it would be possible to obtain great changes of angle by relatively small rotating displacements.

Figure 3:
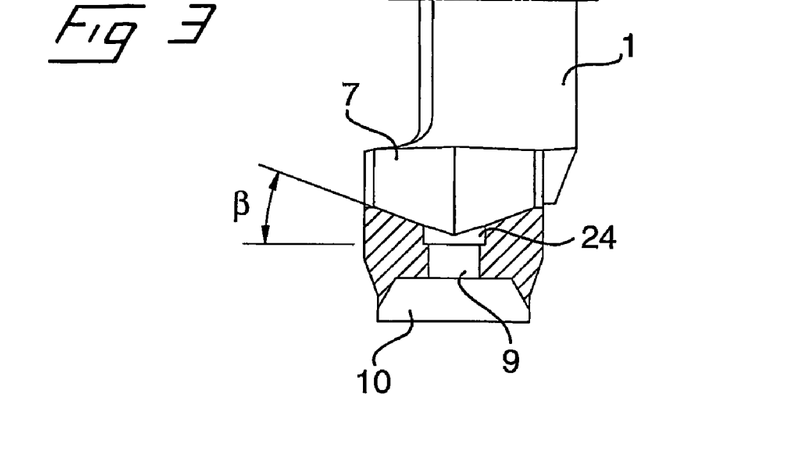
FIG. 3 is an end section through the seat surface of the barking arm.
Figure 4:
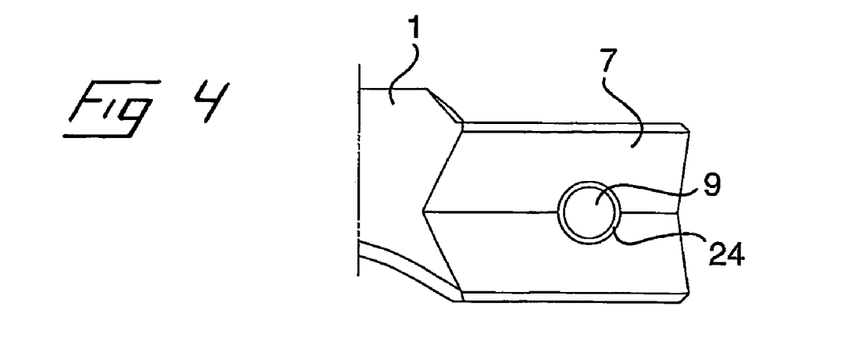
FIG. 4 is a top plan view of the outer end of the barking arm including the seat surface.
Figure 5:
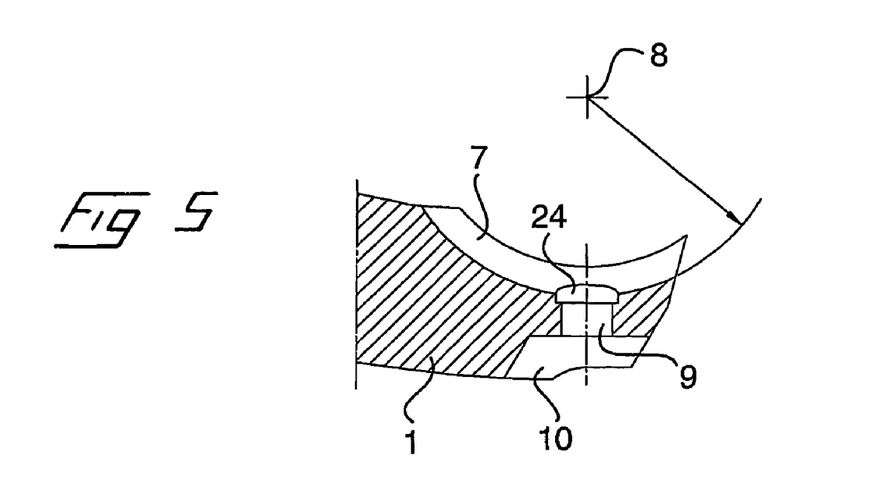
FIG. 5 is a longitudinal section through the outer end of the barking arm.

Now reference is made to FIGS. 3-5, which illustrate in detail the design of the outer end of the barking arm and a seat surface 7 located therein and intended for the barking tool. As is evident from FIG. 5, the seat surface is concave and curved in the form of a circular arc in the longitudinal extent of the barking arm, i.e. essentially perpendicular to the direction of feeding of the logs, about an axis of curvature 8 transversely to the longitudinal extent of the barking arm. Furthermore, the seat surface is, as shown in FIG. 3, V-shaped or groove shaped in a plane transversely to the longitudinal extent of the barking arm. The groove shape is made so that the entire seat surface is in the form of a circular arc about the common axis of curvature 8. This means that the central part of the seat surface, i.e. the deepest part of the groove, has a greater radius of curvature than the portions further towards the lateral edges of the seat surface.

As is evident from FIGS. 3-5, the barking arm is also provided with a through hole 9 extending through the seat surface and intended for a connecting means for connecting a barking tool to the barking arm, and on the underside of the barking arm there is a countersink 10 for a screw head in the area round the hole.

Figure 14:
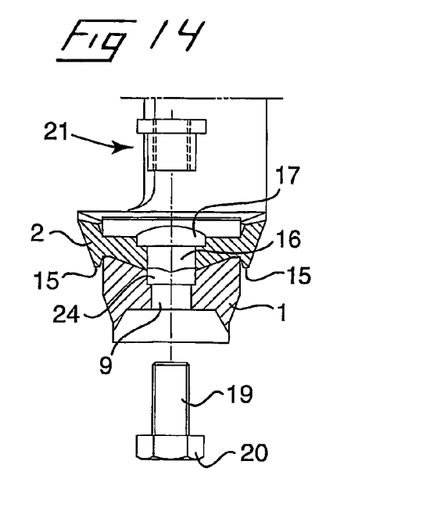
FIG. 14 is a cross-section through the barking arm and the barking tool in a mounted position, with the connecting means parts spaced a distance for the sake of clarity.
Figure 15:
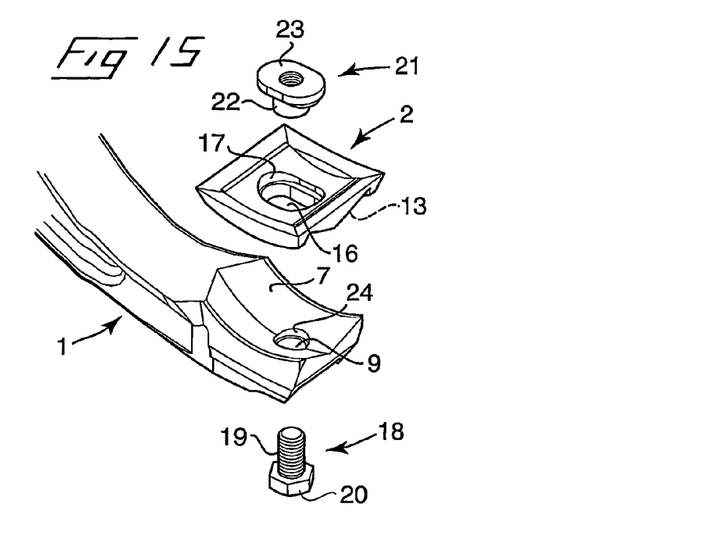
FIG. 15 is a perspective exploded view of the outer end of the barking arm and the barking tool.

Then reference is made to FIGS. 6-9, which show in more detail the design of a barking tool according to the present invention. The barking tool is symmetrical and has two barking edges 11, 11' which are defined between front barking-edge-forming edge portions 6, 6' and rear barking-edge-forming edge portions 12, 12', respectively. Thus the barking tool is reversible in order to locate one barking edge at a time in a position for barking, which thus doubles the working life of the barking tool. A lower surface or mounting surface 13 is, as is evident from FIGS. 6 and 8, convex and curved in the form of a circular arc with respect to an axis of curvature 14. In cross-section according to FIG. 7, the mounting surface 13 is keel-shaped with a ridge or crest along its centre plane, in which the mounting surface has its greatest radius of curvature relative to the axis of curvature 14, while the radius of curvature decreases towards the lateral edges of the barking tool, except in a narrow portion along each lateral edge, in which the barking tool is formed with elongate ridges 15 in the longitudinal extent of the barking arm. In the mounted position of the barking tool on the barking arm, the ridges 15 will extend downwards a distance on the outside of the outer end of each lateral surface of the barking arm, as is best seen in FIG. 14. The ridges 15 will protect the barking arm from wear and penetration of fibre rests between the barking tool and the barking arm.

Figures 6, 8:
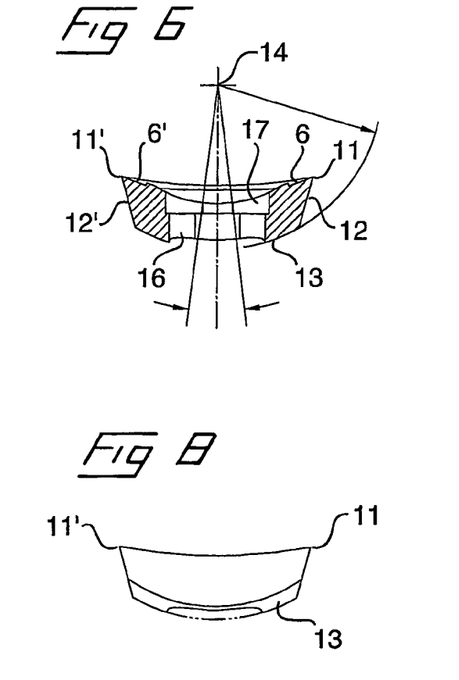
FIG. 6 is a longitudinal section through the barking tool.
FIG. 8 is a side view of the barking tool.
Figure 9:
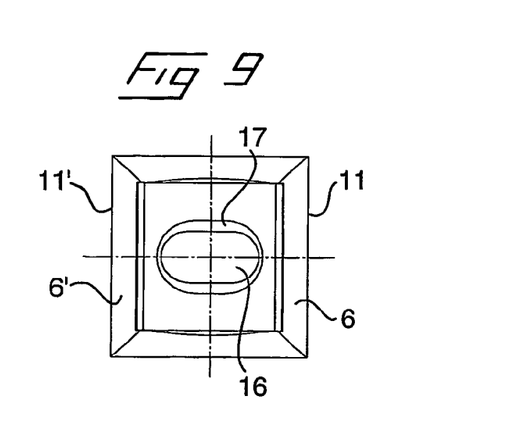
FIG. 9 is a top plan view of the barking tool.

As is evident from FIGS. 6 and 9, the barking tool is made with an elongate through groove 16. The upper surface of the barking tool is further provided with a countersink 17 round the groove.

The connecting means comprises two connecting means parts, viz. a first connecting means part in the form of a screw 18, as is best seen in FIGS. 14-18, with an externally threaded shank 19 and a head 20, and a second connecting means part in the form of a sleeve-like nut 21, 21'. The nut 21, 21' is shown in FIGS. 10-13 in two different designs, which each have an internally threaded shank 22 and an elongate portion or head 23 with an increased diameter. As is best seen in FIGS. 11 and 13, the head 23 of the nut 21, 21' has two different shoulder portions with different cross-sectional dimensions, viz. an upper shoulder portion 23' with a greater cross-sectional dimension which is adapted to fit, essentially without play, in the countersink 17 round the groove 16, and a lower shoulder portion 23" with a smaller cross-sectional dimension, which is adapted to fit in the actual groove 16. Owing to this design, the nut will during mounting be held in the countersink 17 in a manner preventing rotation as well as displacement.

Figure 10:
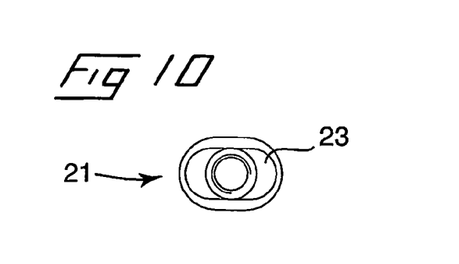
FIG. 10 is a bottom view of a first embodiment of a sleeve-like nut.
Figure 11:
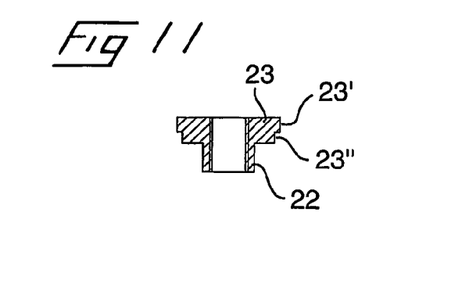
FIG. 11 is a cross-section through the nut according to FIG. 10.

The nut shown in FIGS. 10 and 11 has a shank 22 which is centred relative to the head 23. However, the nut according to FIGS. 12 and 13 has a shank 22 which is eccentric relative to the head 23. The location of the shank 22 relative to the head 23 determines the position which the barking tool 2 will take on the barking arm 1, as will be described below.

Then reference is made to FIGS. 14-18 for description of the assembled barking device and its function. As is evident, the shank 19 of the screw 18 is adapted to be inserted from the barking arm side into the hole 9, while the shank 22 of the nut 21 is adapted to be inserted from the barking tool side into the groove 16. When mounting the barking tool 2 on the barking arm 1, the barking tool is placed with its keel-shaped mounting surface 13 in the groove-shaped countersink, seat surface 17 of the barking arm. Subsequently the screw 18 is inserted through the hole 9 in the barking arm, and a nut 22 with a suitably selected location of the shank relative to the head is inserted, correctly turned relative to the barking tool and the barking arm, down into the groove 16. The barking tool will take a mounting position, with the front barking-edge-forming edge portion 6 or 6' of the barking edge at a certain contact angle relative to the circumferential surface of a log that is to be barked, in dependence on the location of the shank 22, relative to the head 23

Figure 16:
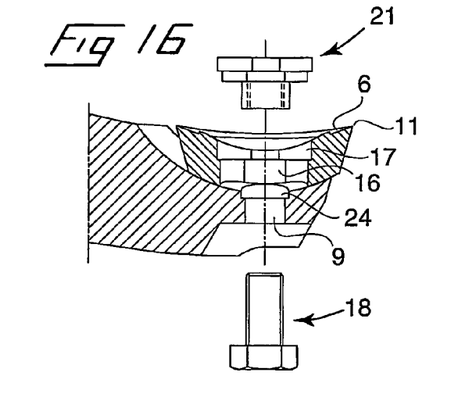
FIG. 16 is a longitudinal section through the outer end of the barking arm and the barking tool in the assembled state with a nut according to a first embodiment, with the connecting means parts spaced a distance for the sake of clarity.
Figure 17:
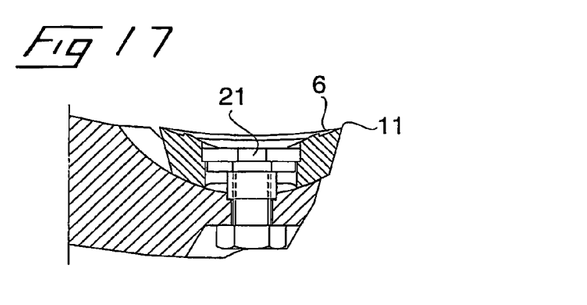
FIG. 17 is a longitudinal section according to FIG. 16, with the connecting means parts mounted.

In FIGS. 16 and 17, the barking tool takes a central position relative to the barking arm by the nut 21 shown in FIGS. 10 and 11 being used, whose shank is centred relative to the head.

Figure 12:
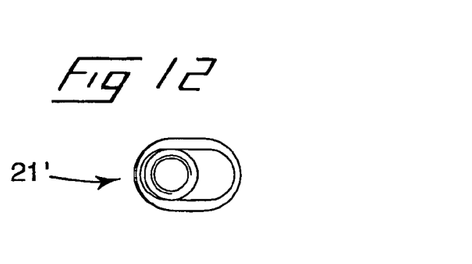
FIG. 12 is a bottom view of a second embodiment of a sleeve-like nut.
Figure 13:
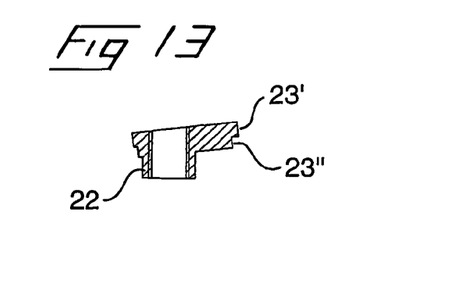
FIG. 13 is a cross-section through the nut in FIG. 12.
Figure 18:
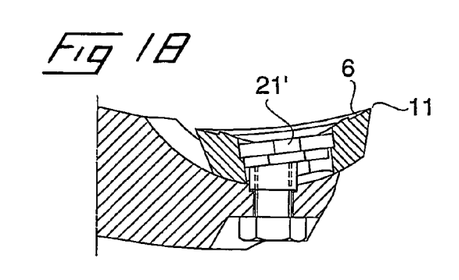
FIG. 18 is a longitudinal section according to FIG. 17, with a nut according to a second embodiment and the barking tool in a maximally extended position.
Figure 19:
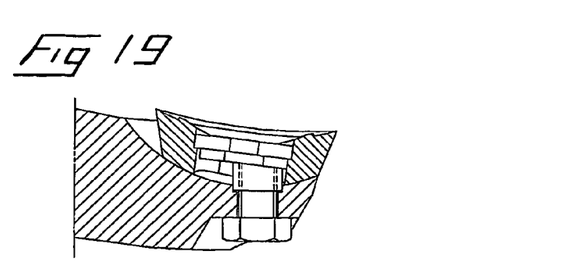
FIG. 19 is a longitudinal section according to FIG. 18, with the barking tool in a maximally retracted position.

In FIG. 18, however, the barking tool is displaced to an outer position on the barking arm by the nut 21' shown in FIGS. 12 and 13 being used, whose shank is eccentric relative to the head and whose projecting part of the head is oriented outwards towards the logs that are to be barked. Owing to the seat surface 7 which is convex in the form of a circular arc and the mounting surface 13 which is concave in the form of a circular arc, the barking tool will, during displacement, be turned so that the front barking-edge-forming edge portion 6 is oriented at a relatively great angle to the tangent at the engaging point with the circumferential surface of the log that is to be barked. Owing to the relatively great angle, the aggressiveness of the barking tool with respect to the barking properties will be great, which is suitable, for instance, for tightly adhering bark. If it is desirable to change the aggressiveness of the barking tool, one of the nuts can be exchanged for one with a different eccentricity of the shank relative to the head, for instance the nut 21 according to FIGS. 10 and 11 with a centred shank, or the nut 21' can be turned so that the projecting part of the head is oriented inwards away from the logs that are to be barked, as shown in FIG. 19. In this case, the connecting means parts need not be completely released from each other, but the screw is unscrewed from the nut only so far that the head of the nut can be raised from the countersink and turned through 180°. As seen in FIG. 19, the barking tool will then have a less extended position relative to the barking arm, and the angle between the barking-edge-forming edge portion 6 and the circumferential surface of the log decreases, which also reduces the aggressiveness of the barking tool with respect to the barking properties, which is suitable, for instance, for loosely adhering bark.

As shown in FIGS. 17-19, the length of the shank 22 of the nut is adjusted so that in the mounted state the shank extends through the entire barking tool and a distance down into the barking arm. For this reason, a countersink 24 is made for the end of the shank 22 of the nut, as is also seen in FIGS. 3-5. This ensures that the screw 18 will only be subjected to the tensile force that is required to press the barking tool against the barking arm. The entire shear force will, however, be absorbed by the nut 21, 21'. Such an embodiment is, however, in many cases not necessary since the barking tool can in most cases, for instance by means of the clamping effect described below, still be held sufficiently firmly on the barking arm. An advantage of not designing the barking device in this manner is that a machining step can be excluded since the hole 9 in the barking arm need not be countersunk to hold the end of the shank of the nut.

Figure 7:
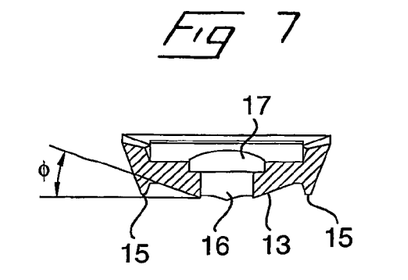
FIG. 7 is a cross-section through the barking tool.

In the preferred embodiment here shown and described, the angle β of the seat surface 7 of the barking arm is, according to FIG. 3, about 21° while the angle φ of the mounting surface 13 of the barking tool, according to FIG. 7 is about 20°. This means that when tightening the connecting means, the material of the barking tool and the barking arm will be deformed until a tight fit is obtained between the mounting surface 13 and the seat surface 7, thereby achieving a bias in the screw, which ensures a safe connection, without play, between the barking tool and the barking arm.

In the preferred embodiment, the radii of curvature of the seat surface 7 relative to the first axis of curvature 8 are the same as the corresponding radii of curvature of the mounting surface 13 of the barking tool relative to the second axis of curvature 14. However, it would be possible to obtain a clamping effect like in the case of the angles β and φ above, by making the radii of curvature of the seat surface 7 slightly smaller than the corresponding radii of curvature of the mounting surface 13. The two described methods for obtaining a clamping effect, and thus safe retaining, between the barking tool and the barking arm can be used each separately or be combined in one and the same embodiment.

The invention claimed is

1. A barking device for use in a log barking machine comprising a barking arm (1) and a barking tool (2) which has at least one barking edge (11, 11'), said barking arm having an outer end including a tool seat(7) said barking tool having a convex mounting surface (13) which is curved in the form of a circular arc about a first axis of curvature (14) and is adapted to abut against said tool seat(7) at the outer end of the barking arm, said tool seat having a concave seat surface curved in the form of a circular arc about a second axis of curvature (8) which is oriented essentially parallel to the intended direction of feeding of the logs, said barking tool being mountable in the tool seat and displaceable by rotating displacement about the second axis of curvature between two or more mounting positions, and means for connecting said barking tool to said tool seat tool including a first connecting means part comprising a screw (18) with an externally threaded shank (19) and a head (20) whose diameter is greater than the shank, and a second connecting means part comprising nut (21) having an internally threaded shank (22), into which the shank of the screw is screwable and a head (23) whose diameter is greater than the shank, and a through hole (9) in the barking arm (1) or the barking tool (2) and an elongate through groove (16) in the other of these parts, said groove extending essentially perpendicular to the intended direction of feeding of the logs and having a greatest width which is insignificantly greater than the diameter of the shank of one of the connecting means parts and said groove having a countersink (17) for the head of one of the connecting means parts along lateral edges of the groove, one of the connecting means parts being adapted to be inserted from the groove with its shank extending through the groove and its head located in the countersink, said head having a shape and size which non-rotatably and essentially without play fits in at least one of the countersink or groove to prevent displacement and rotation, said first and second connecting means parts being screwed together in such a manner that, when the connecting means parts are released from each other, the barking tool is rotatably displaceable with its concave mounting surface (13) along the seat surface (7) to different selectable mounting positions with different contact angles for a front barking-edge-forming edge portion (6, 6') of the barking tool, and, with the connecting means parts tightened relative to each other, the barking tool is connectible in a manner preventing displacement and rotation in a selectable position by the connecting means part with the head designed to prevent displacement and rotation being either reversible by being eccentrically formed with a distance between a centre line of the shank and a centre line of the head, or exchangeable for one with a different distance between a centre line of the shank and a centre line of the head, and also exchangeable for one with a concentrically placed shank relative to the head.

2. A barking device as claimed in claim 1, wherein the length of the shank (22) of the nut (21, 21') is adapted so that, when the nut is in the connecting position inserted from the barking tool (2) or the barking arm (1), the shank of the nut extends also at least a distance into the other of said barking arm or barking tool parts.

3. A barking device as claimed in claim 1 wherein the barking tool (2) has a convex mounting surface (13) which is keel-shaped, having at least two surfaces curved in the form of circular arcs at an angle to each other, which, in the area of the centre of the barking tool, form a ridge or crest directed essentially perpendicular to the intended direction of feeding of the logs.

4. A barking device as claimed in claim 3, wherein the barking arm (1) has a concave seat surface (7), which is groove-shaped and has at least two surfaces curved in the form of circular arcs at an angle to each other, which, in the area of the centre of the seat surface, form a groove directed essentially perpendicular to the intended direction of feeding of the logs.

5. A barking device as claimed in claim 1, wherein the barking tool (2) has a ridge (15) extending essentially perpendicular to the intended direction of feeding of the logs and positioned along at least one lateral edge, said ridge extending, in the state of the barking tool mounted on the barking arm, a distance beyond the outside of the outer lateral surface of the barking arm and thereby protecting the barking arm from wear.

6. A barking tool for use in a barking device during longitudinal feeding of logs through the device having at least one barking edge (11, 11'), which is mountable in a tool seat at an outer end of a barking arm (1), said barking tool having a convex mounting surface (13) which is curved in the form of a circular arc about a first axis of curvature (14) and adapted to abut against a correspondingly concave seat surface (7); in the tool seat at the outer end of the barking arm, which concave seat surface is in turn curved in the form of a circular arc about a second axis of curvature (8), the barking tool being, with the aid of a connecting means comprising two connecting means parts (18, 21) which are screwable to each other and have heads (20, 23), mountable in the tool seat and displaceable by rotating displacement about the second axis of curvature between two or more different mounting positions, and said barking tool having an elongate through groove (16) for the shank (19,22) of one of the connecting means parts, said groove extending essentially perpendicular to the intended direction of feeding of the logs and having a countersink (17) along the groove for receiving the head (20, 23) of one of the connecting means parts.

7. A barking tool as claimed in claim 6, wherein the convex mounting surface (13) of the barking tool is keel-shaped, having at least two surfaces curved in the form of circular arcs at an angle to each other, which in the area of the centre of the barking tool form a ridge or crest directed essentially perpendicular to the intended direction of feeding of the logs.

8. A barking tool as claimed in any one of claims 6 or 7 wherein the barking tool has a ridge (15) extending essentially perpendicular to the intended direction of feeding of the logs and is positioned along at least one lateral edge, said ridge extending, in the state of the barking tool (2) mounted on the barking arm (1), a distance beyond the outside of the outer lateral surface of the barking arm and thereby protecting the barking arm from wear.

* * * * *